United States Patent [19]
Lee, III et al.

[11] Patent Number: 5,121,947
[45] Date of Patent: Jun. 16, 1992

[54] EXPANSION SEALING DEVICE

[75] Inventors: Leighton Lee, III, Old Saybrook; Jeffrey C. Dickey, Westbrook; Loren Bonsack, Deep River; Fredrick J. Pecor, Clinton; John L. Grillo, East Haddam, all of Conn.

[73] Assignee: The Lee Company, Westbrook, Conn.

[21] Appl. No.: 653,014

[22] Filed: Feb. 8, 1991

[51] Int. Cl.$^5$ .............................................. F16K 17/18
[52] U.S. Cl. .................................. 285/132; 137/508; 137/599.2
[58] Field of Search .............. 137/625.6, 508, 843, 137/599.2, 514.5; 411/72, 55; 251/129.06; 210/232; 285/132

[56] References Cited

U.S. PATENT DOCUMENTS

| | | | |
|---|---|---|---|
| 2,821,323 | 1/1958 | Lee | 411/72 |
| 3,874,409 | 4/1975 | Lee | 137/599.2 |
| 4,418,715 | 12/1983 | Balazs et al. | 137/508 |
| 4,706,705 | 11/1987 | Lee, II | 137/514.5 |
| 4,741,364 | 5/1988 | Stoss et al. | 137/625.6 |
| 4,836,240 | 6/1989 | Elliott | 137/508 |
| 4,855,041 | 8/1989 | Church et al. | 210/232 |
| 4,921,017 | 5/1990 | Tada | 137/843 |
| 4,926,908 | 5/1990 | Dschida | 137/599.2 |
| 4,971,290 | 11/1990 | Dahlmann | 251/129.06 |
| 5,023,990 | 6/1991 | Lee, II et al. | 411/55 |

*Primary Examiner*—Eric K. Nicholson
*Attorney, Agent, or Firm*—Philip J. Lee

[57] ABSTRACT

A device for providing a sealed intersection between flow passages within a housing comprises an expansion sleeve with a cylindrical outer surface and an axially tapered inner surface for receiving a frusto-conical inner member of greater average diameter and the expansion sleeve is radially expanded in place after insertion into the installation bore, by the forcible insertion therein of the inner member. No interference occurs between the sleeve and the installation bore until after the sleeve is in place in the bore. The outer surface of the sleeve is reduced or not as many be desired to provide fluid communication among the flow passages. Two embodiments differ in that one seals between axially separated ports while the other seals between angularly separated ports.

21 Claims, 9 Drawing Sheets

EXPANSION SEALING DEVICE

BACKGROUND OF THE INVENTION

1. Field of the Invention

The present invention relates generally to methods of sealing and sealing devices and particularly for methods and devices for sealing between and around connections between a control device and fluid passages within a housing.

2. Description of Related art

It is sometimes desireable to install a flow control device into an installation bore which intercepts and communicates with one or more fluid passage contained within a housing, requiring provision for fluid communication between the intercepted fluid passage and the ports of the flow control device while sealing against internal or external leakage and to prevent cross over of flow. Conventional methods of sealing of such devices utilize "O" rings or other elastomeric seal materials, an example of which is illustrated in FIG. 9. Such seals are typically retained within a groove and may in miniature applications, be cumbersome causing disproportionately large distances between ports. Moreover, such conventional seals are fully expanded upon assembly on the member to be sealed and therefore, to provide substantial radial sealing force, the seals must have an outside diameter greater than the inside diameter of the installation bore, thereby crating an interference fit. Such seals must be formed of substances that are both deformable and sufficiently elastic to exert adequate sealing force and many suitable materials are relatively soft and are readily damaged by the interference with the installation hole as well as any burrs caused by the interception o creation of fluid passage ways in the side wall of the installation hole. Avoiding damage to the seal by resorting to a stepped installation hole increases the complexity and the size of the overall installation. Moreover, the radial Clearance between the installation bore and the body of the installed device may only be bridged by the elastomeric seal material, which, being relatively soft may not withstand exposure to high pressure fluids. Such sealing devices only provide sealing between axially separated ports, thereby presenting limitations in the number of separate ports that can be accommodated within a limited axial dimension.

SUMMARY OF THE INVENTION

The invention herein described comprises a sleeve with a generally cylindrical outer surface which when unexpanded is of slightly less outside diameter than inside diameter of the bore in which installation is desired. The internal surface of the sleeve receives an inner member which forms a part of the valve assembly or other fluid control to be installed. The inner member is coaxial with the sleeve and slightly greater average outside diameter than the average inside diameter of the sleeve. The outer surface of the inner member is generally cylindrical or in the preferred embodiment is frusto-conical with a rate of taper similar to that of the inner surface of the sleeve. The interference between the inner member and sleeve, upon insertion of the inner member into the sleeve causes the sleeve to radially expand and engage the installation bore. The inner member further comprises ports providing fluid communication between flow passages intersecting the installation bore and flow paths within the fluid control device. In a first embodiment of the invention, as illustrated in FIGS. 1-4, the ports are axially separated and the sleeve designed for use for such a device comprises circumferentially extending annular sealing surfaces. The annular sealing surfaces comprise two axially spaced circumferentially extending lands that are axially separated by an annular groove. The annular sealing surfaces are axially spaced in accordance with the corresponding axial spacing of the ports of the inner member so that on insertion of the inner member into the sleeve, all ports on the same axial level, are isolated from the atmosphere, the ports on any other axial level and any other environment other than the fluid passage desired to be communicated to said port. Axially between the annular sealing surfaces, the outer surface of the sleeve is radially reduced to provide an annular channel approximately the same axial position as the ports and the fluid passage ways intersecting the installation bore. The reduced section of the sleeve is radially traversed by an opening or section of the sleeve is radially traversed by an opening or openings through which the inner member ports are allowed to be in fluid communication with the flow passages intersecting the installation bore. The inner member is retained from insertion to more than a desired depth in the installation bore by a inwardly projecting shoulder in the installation bore. The inner member can be retained within the installation bore by a variety of means including the use of an annular retaining member whose outside surface comprises male screw threads engageable with female screw threads in the installation bore. In this configuration, the inner member is restrained relative to the retaining member by an outwardly projecting shoulder abutting the retaining member. The clearance between the inner member and the retaining member allows the inner member to be inserted without rotation which if allowed might eliminate the proper alignment of the inner member and sleeve. The annular retaining member is adapted to receive means for applying forcible rotational torque to the retaining member. Alternative means for retaining the inner member include the use of a flange and bolt assembly. In configurations wherein the axial force is exerted by the fluid media is relatively low, for example installation into a blind bore, or if the device is adapted to be resistant to distortion, the device may be configured to be frictionally self holding, thus eliminating the necessity for a retaining member or separate retaining means.

Installation of the first embodiment requires formation of an installation bore with an inner shoulder or other means for locating and limit fixing the sleeve and the inner member at a predetermined depth such that upon full insertion of the inner member into the sleeve, the axial depth of the ports, the fluid passages into the bore, and the openings in the outer surface of the sleeve all are in axial alignment thereby allowing the desired communications of the fluid flow passages with the fluid control device. Alignment of the sleeve with respect to the intersecting flow passage is not required but for maximum flow capacity, the inner member ports are aligned with the sleeve openings.

In a second embodiment of the present invention, as illustrated in FIGS. 5-8, the ports on the inner member are angularly separated and the sleeve is configured to form axially extending sealing surfaces which angularly separate and seal the ports of the inner member from each other and from other flow passages. Installation of this second embodiment of the invention requires that the flow passages radially intersecting the installation bore and the respective openings in the sleeve and ports in the inner member all must be brought into angular alignment. It is generally preferable that the sealing surfaces be equiangularly displaced about the axis of the sleeve and inner member to provide a uniform sealing stress on the sleeve and uniform stress on the inner member thereby avoiding distortion that might otherwise interfere with the proper functioning of the flow control device, in particular, distortion of valve seats. The radial stresses found in the first embodiment are relatively uniform but in the second embodiment, it has been found beneficial to have more than two equiangularly separated contact areas to avoid distortion resulting from having only two stress points and two stress relief points with 180° between the stress points. For this reason, the outer surface of the sleeve of the second embodiment comprises flat milled sections angularly displaced between the openings, serving to relieve the stress on the inner member and provide required spacing between stress points. The second embodiment therefore comprises a total of four equiangularly displaced stress points and four equiangularly displaced stress relief points.

The taper angle of the sleeve and inner member of both embodiments are such that the sleeve and inner member may be 10 preassembled by partial insertion of the inner member into the sleeve prior to installation with only such incidental expansion of the sleeve as may be necessary to frictionally retain the relative position of the elements. The frictional retention and security of the sleeve by the inner member allows the preassembly process to be performed coincidentally with manufacture of the respective elements and therefore alignment of the sleeve openings with the inner member ports can be performed under the relatively controlled conditions of the manufacturing environment.

The method of the present invention is to provide the desired seal by tapering the outside surface of the portion of the flow control device to be installed and using an appropriately sized and configured sleeve into which the inner member is inserted. As long as the interference between the inner member and the sleeve is greater than the clearance between the sleeve and the installation bore, forcible sealing will occur after full insertion of the sleeve into the bore. The embodiments described herein are exemplars of the application of this method which can be beneficially applied to a variety of configurations. For example, the ports and flow passages between which sealing is required may be both axially and angularly separated; although in such an embodiment, the sleeve on the installed device must be aligned with both the flow passages and the valve ports, both angularly and axially. In addition, the features of the valve shown in the drawings are given for the purpose of illustration only and do not constitute part of the invention.

In either embodiment it is also possible to create secondary flow passages to provide for pilot flows by cutting grooves in the outside surface of the inner member or in either the outer or the inner surfaces of the sleeve. It is also possible to form the sleeve and inner member of a variety of materials depending upon the expected flow conditions and performance requirements. Because the outer sealing surfaces of the sleeve of the present invention are not expanded into forcible sealing contact with the installation bore until after located in position, there is little or no relative movement of the sleeve within the installation bore during the time that an interference is caused between the outer surface of the sleeve and the inner surface of the installation bore. For this reason, little if any, potential damage to the outer surface of the sleeve is presented by burrs or minor irregularities in the inner surface of the installation bore. In addition, the material of the sleeve need only be sufficiently resilient to withstand the radial expansion caused by the full insertion of the inner member, Without cracking but need not be otherwise deformable as is required in conventional seals wherein in the interference it is achieved prior to insertion seal into the bore. Due to the fact that these material limitations are not of concern in the present invention, the material of the sleeve can be selected from a wide range of materials depending upon specific performance or design considerations. For example, provided they are compatible with materials of the inner wall of installation bore, metallic substances can be used to form the sleeve to provide a high degree of frictional retention and to cause the sealing when desired for use in high pressure flows or when removeability is not a primary concern. Due to the reduced likelihood of damage to the sleeve material, in relatively low pressure applications, the sleeve may also be beneficially formed of materials similar to those as may be used in conventional seals, in which case, the fluid control device would be readily removable. Limitations of the acceptable materials usually required to avoid galling between the inner member surface and the sleeve interior should be considered; however, use of materials having high relative coefficients of friction is not required as the retention of the seal and inner member in the installation bore is not dependant upon the friction of these surfaces.

The principal aim of the present invention is to provide a new and improved means for sealing the intersection of the ports of a flow control device and flow passages formed or found within a housing.

An additional aim of the present invention is to provide a new and improved sealing means that is capable of withstanding pressures of up to 20000 PSI.

An additional object of the present invention is to provide a seal foregoing capabilities formed of materials having high strength and durability characteristics that can be installed without the use of lubricants.

These and other features, uses, objects and advantages of the invention will become apparent from the Description of the Preferred Embodiments and the Drawings.

DESCRIPTION OF THE PREFERRED EMBODIMENT(S)

With reference to the drawings wherein like numerals represent like parts throughout the figures, a preferred embodiment of a sealing device in accordance with the present invention is generally designated in FIGS. 1 through 4 by the numeral 10.

Figure 1:
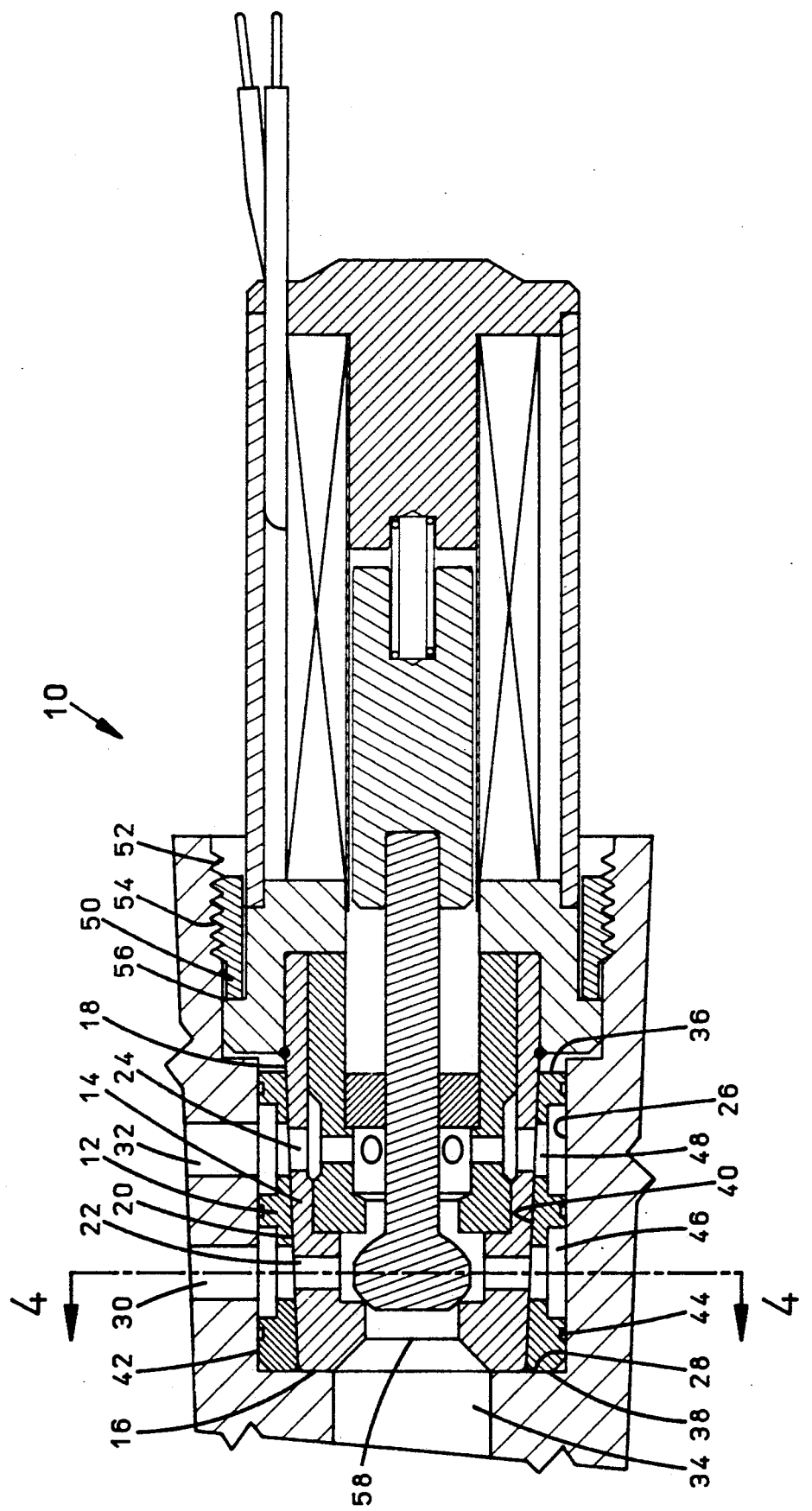
FIG. 1 is an axial sectional view of a first embodiment of an expansion sleeve and inner member in accordance with the present invention shown fully installed in an installation bore.
Figure 2:
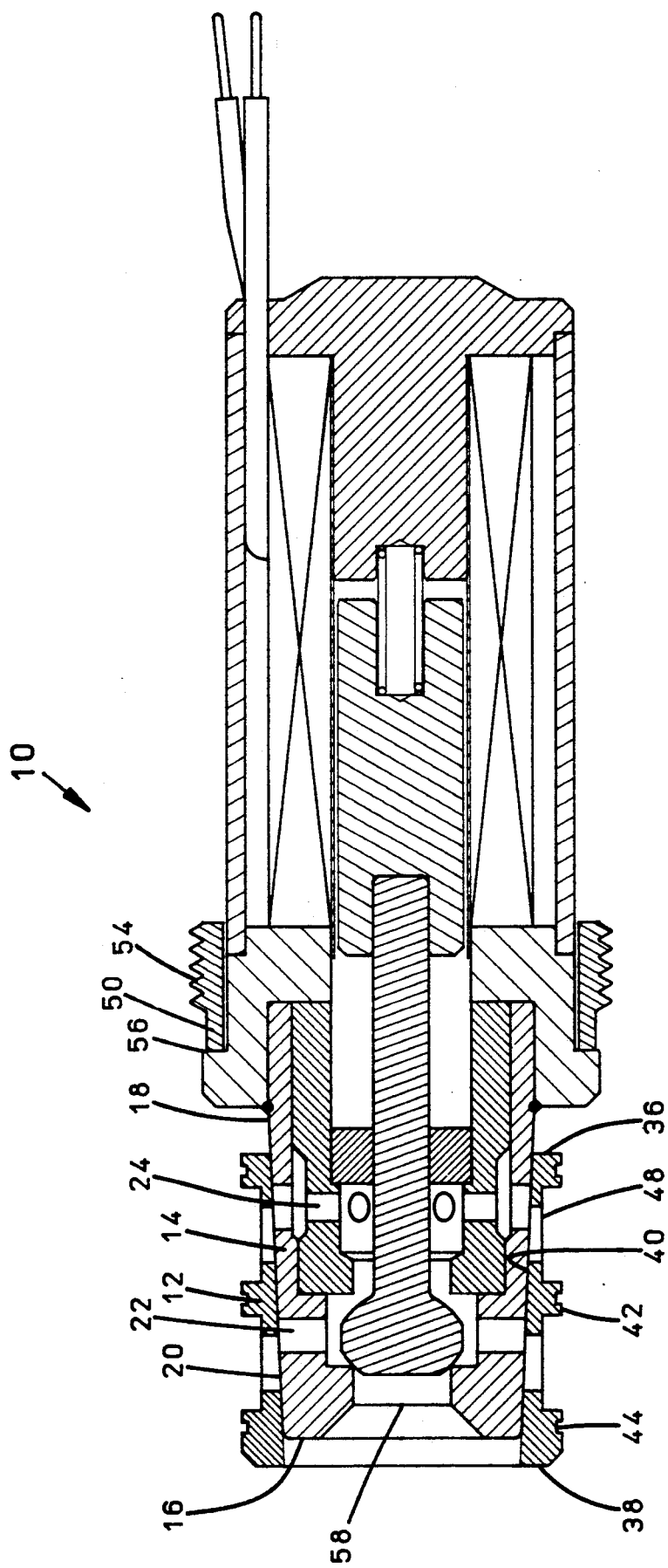
FIG. 2 is an axial sectional view of a first embodiment of an expansion sleeve and inner member in accordance with the present invention shown partially assembled before installation.
Figure 3:
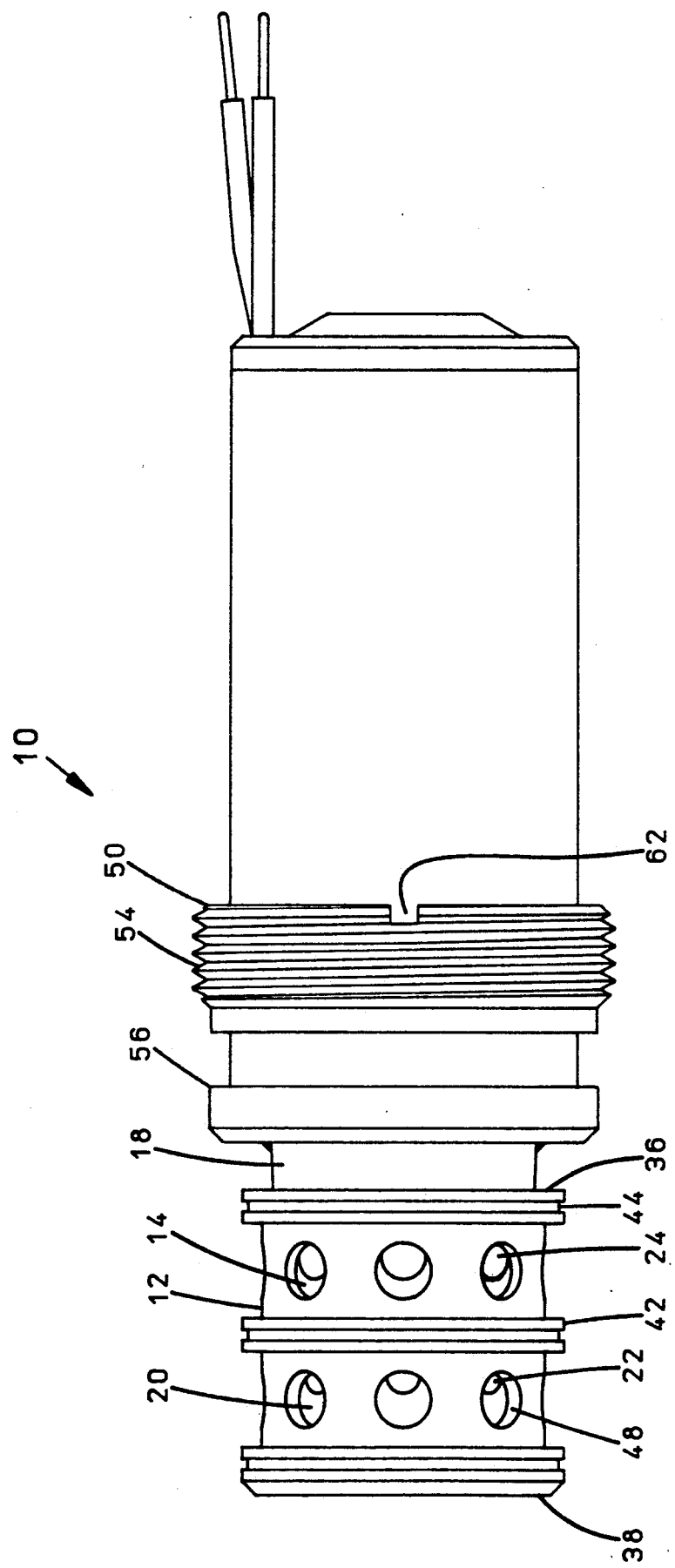
FIG. 3 is an pictorial side view of a first embodiment of an expansion sleeve and inner member in accordance with the present invention shown partially assembled before installation.
Figure 4:
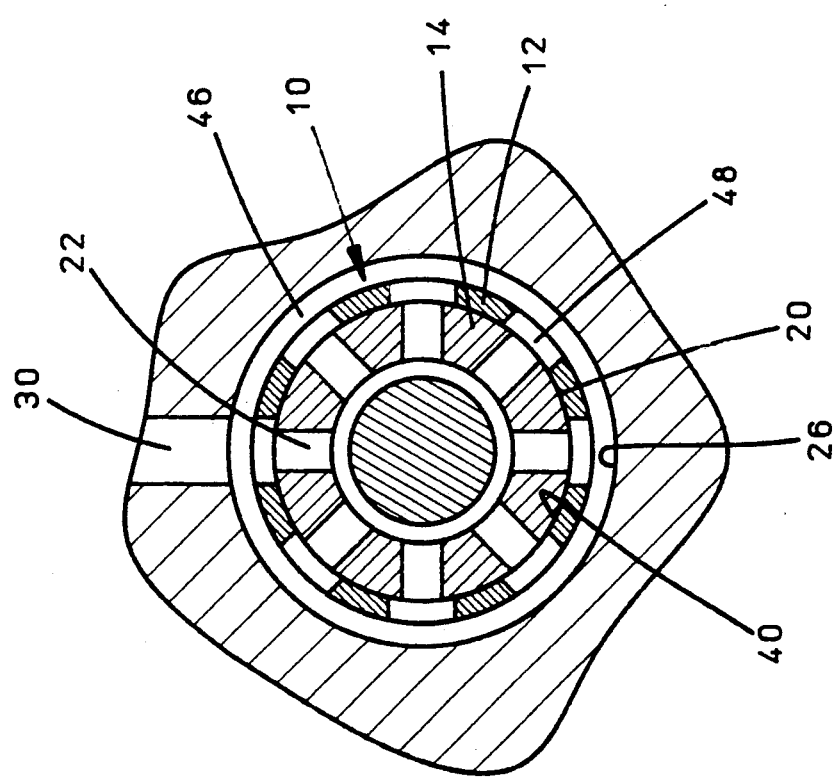
FIG. 4 is a cross sectional view of an expansion sleeve and inner member in accordance with the present invention taken along the line 4—4 shown in FIG. 1.
Figure 5:
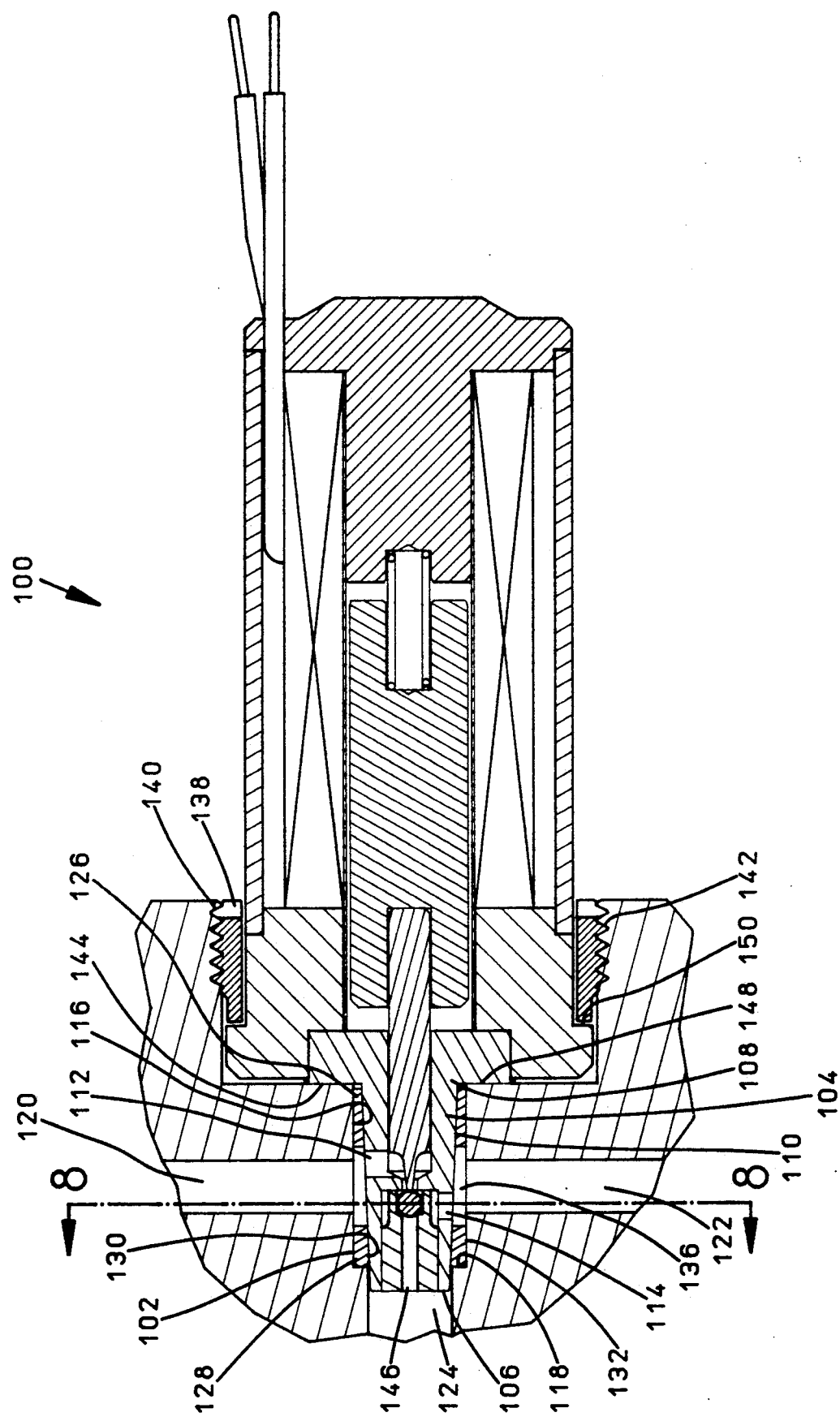
FIG. 5 is an axial sectional view of a second embodiment of an expansion sleeve and inner member in accordance with the present invention shown fully installed in an installation bore.

The sealing device 10 is comprised of an expansion sleeve 12 and an inner member 14 which inner member 14 is a part of a flow control device or component to be put in fluid communication with flow passages intersecting and communicating with an installation bore within a housing. Inner member 14 has an interior end 16 and an exterior end 18, the inner member exterior end 18 being connected to or a part of a flow control device. Between the inner member interior end 16 and inner member exterior end 18, the inner member 14 forms a surface 20 that engages the expansion sleeve 12, which inner member surface 20 is axially tapered to present a generally frusto-conical surface with a smaller outside diameter at inner member interior end 16 and a larger diameter at the inner member exterior end 18. The sealing device 10 is dimensioned and adapted for use in situations wherein communication is desired between the flow control device and one or more flow passages located at or near the surface of the housing so as to intersect and communicate with an installation bore and wherein the flow passages are separated generally in the dimension represented by the axis of the installation bore, typically normal to the housing surface. An installation bore and flow passage of this type are shown in FIG. 1 wherein the wall 26 of the installation bore intersects a first flow passage 30 and a second flow passage 32. The device 10 also communicates with an axial flow passage 34 that is generally co-axial with the installation bore. The flow control device communicates through openings in the inner member surface 20 which are designated in FIG. 1 of a first preferred embodiment, as valve port 22 and valve port 24, which valve ports 22 and 24 are axially separated in Device 10. The inner member 14 also comprises an axial valve port 58 located at the inner member interior end 16 and generally coaxial with the inner member 14. The inner member exterior end 18 comprises a area of increased diameter forming an annular, radially outward extending shoulder 56. A retaining member 50 comprises an annular sleeve having an exterior surface forming male screw threads 54. In the illustrated preferred embodiments, the retaining member 50 abuts shoulder 56 and engages female screw threads 52 in the outer end of the installation bore. Retaining member 50 is sized to allow a clearance between it and inner member 14 and comprises slots 62 that allow use of a wrench or other means of applying rotation torque to retaining member 50 to cause the retaining member to advance to engagement with the inner member 14 such that the inner member 14 is retained within sleeve 12 after sleeve 12 has been fully inserted into the installation bore and after the inner member 14 has been pressed into full insertion into sleeve 12 by means of an installation tool (not shown).

The expansion sleeve 12 is generally Co-axial with the inner member 14 and is formed to present a generally frusto-conical inner surface 40 with a rate of axial taper approximately equal to the rate of taper of the inner member surface 20 but which in its unexpanded pre-installation state is of an average inside diameter that is less than the average outside diameter of the inner member surface 20, over equal lengths of equal axial distance of the inner member surface 20 and the expansion sleeve inner surface 40. An interference fit is thereby created such that upon forcible insertion of inner member 14 into the expansion sleeve 12, the expansion sleeve 12 is forced to radially expand. The angle of taper of the inner member surface 20 and the expansion sleeve inner surface 40 are such, that the expansion sleeve 12 and inner member 14 maybe preassembled by the partial insertion of the inner member 14 into the expansion sleeve 12 without forcibly expanding the expansion sleeve 12. In the illustrated preferred embodiment, the taper is such that the diameter is changed at the rate of one inch per axial foot.

It will be anticipated that variations from the rate of taper may be made without departing from the teaching of the present invention. The retaining member 50 serves to prevent the movement of Device 10 back out of the installation bore either by sliding of either the inner member surface 20 in relation to sleeve surface of the exterior surface 42 of sleeve 12 in relation to the installation bore wall 26. Therefore, the functional retention of the Device 10 does not depend upon whether these surfaces are self holding which in turn depends upon the angle of taper and the materials used. For this reason, the angle or rate of taper of the inner member surface 20 may be relatively large with the result that the amount of expansion of the sleeve also may be relatively large. If, as will be further discussed, the retaining member 50 is eliminated, and device 10 must be self holding, limitations of taper angle and materials must be considered.

The expansion sleeve 12 comprises a expansion sleeve interior end 38 and the expansion sleeve exterior end 36 and the inside diameter of the expansion sleeve inner surface 40 is less at the expansion sleeve interior end 38 than at the expansion sleeve exterior end 36. The expansion sleeve 12 further comprises an exterior surface 42 that is generally cylindrical. The outside diameter of expansion sleeve exterior surface 42 is reduced at a point that approximates the axial position of the flow passage 30 in the fully installed Device 10. The expansion sleeve exterior surface 42 is again reduced at approximately the same axial position as the flow passage 32 would occupy in relation to the fully installed device 10. Upon the insertion of the expansion sleeve 12 into the installation bore, the areas of reduced outside diameter of the expansion sleeve exterior surface 42 create annular chambers 46, which are in fluid communication with flow passages 30 and 32 and which communicate by means of openings 48 through the expansion sleeve 12 to valve ports 22 and 24. At the expansion sleeve exterior end 36 and at expansion sleeve interior end 38 and between the annular chambers 46, the expansion sleeve exterior surface 42 further comprises a circumferentially extending annular groove 44, which separates two axially spaced lands, thereby providing additional sealing edges. Reference is made to the teaching of U.S. Pat. No. 2,821,323 granted to Lee II on Jan. 28, 1958 relating to the sealing of a bore within a housing by similar means.

As part of the adaptation of the housing to accept and retain sealing device 10, an annular shoulder 28 is provided by an area of reduced inside diameter at the interior end of the installation bore. Shoulder 28 extends radially inward more than the thickness of the expansion sleeve interior end 38 so as to engage and stop the axially inward movement of both the expansion sleeve 12 and the inner member 14, upon installation. The outside diameter of the unexpanded expansion sleeve exterior surface 42 is slightly less than the inside diameter of the installation bore wall 26 so there is no interference between the sleeve 12 and the installation bore upon installation. The preassembled sealing device 10 is installed by the insertion of expansion sleeve 12 into the installation bore until the expansion sleeve interior end 38 is stopped by shoulder 28 after which an installation tool is used to forcibly press inner member 14 into sleeve 12 until the inner member interior end 16 is also stopped by shoulder 28 causing the expansion sleeve 12 to radially expand. After full insertion, rotational torque is applied to the retaining member 50 and the inner member 14 is thereby retained within the expansion sleeve 12. The expansion sleeve exterior surface 42 forcibly and sealingly engages the installation bore wall 26 at all points except those areas of reduced outside diameter thereby forming chambers 46. The depth of insertion of the sealing device 10 is controlled by the location of the shoulder 28 and is predetermined so that the annular chambers 46 intersect the opening of first flow passage 30 and second flow passage 32 thereby allowing fluid communication from first flow passage 30 and second flow passage 32 to valve port 22 and valve port 24 respectfully. It will be appreciated that although the illustrated preferred embodiment is adapted for use under circumstances wherein there are two axially separated radially intersecting flow passages as well an axial flow passage, the sealing device 10 could readily be adapted for use with 1 or more flow passages, device 10 will function in circumstances where common communications with all flow passages at the same axial position is desired but where no angularly separated flow passages must be sealed from one another.

In FIGS. 5 through 8 a second embodiment of the invention is generally designated by the numeral 100. The sealing device 100 employs many features similar to the sealing device 10 put is adapted for use in intersecting flow passages that may or may not be separated in the axial dimension of the sealing device 100 but do require sealing between angularly separated flow passages and valve ports.

The sealing device 100 comprises an expansion sleeve 102 and inner member 104. Inner member 104 presents a tapered surface 110 from its interior end 106 to exterior end 108 with a similar rate of taper as that described with reference to device 10. The valve ports 112 and 114 are equiangularly displaced about the axis of inner member 104 and although an axial separation is shown between valve ports 112 and 114, embodiment 100 is designed for uses wherein the axial separation of the flow passages and of the valve ports is not significant enough to allow axial sealing between the valve ports as is accomplished by device 10. Similar to sleeve 12 of device 10, the expansion sleeve 102 of device 100 has an exterior end 126 and an interior end 128 and an axially tapered inner surface 130, as well as a sleeve exterior surface 132. The sleeve exterior surface 132 is generally cylindrical and comprises angularly displaced openings 136 which may be axially elongated in order to facilitate proper depth alignment between openings 136 and flow passages 120 and 122. Sleeve 102 is inserted until interior end 128 abuts and is stopped by an annular, inwardly extending, exterior end 126 facing, shoulder 118 formed by the inside wall 116 of the installation bore. At the inner member exterior end 108, inner member 104 forms an annular, outwardly extending, interior end facing, shoulder 144 and at a proximate position, the inside diameter of the installation bore is increased to form an installation bore shoulder 148 that opposes inner member shoulder 144. A retaining member 138 is provided, similar to retaining member 50, that abuts an annular, radially outwardly extending and exterior end facing shoulder 150 of inner member 104 and comprises an outer surface forming male screw threads 142 threadingly engageable with female screw threads 140 in the installation bore. Retaining member 138 retains the inner member 104 and sleeve 102 within the installation bore after the controllable and forcible insertion of inner member 104 into the sleeve 102 by an installation tool until inner member 104 is stopped by the engagement of opposing shoulders 148 and 144.

Figure 6:
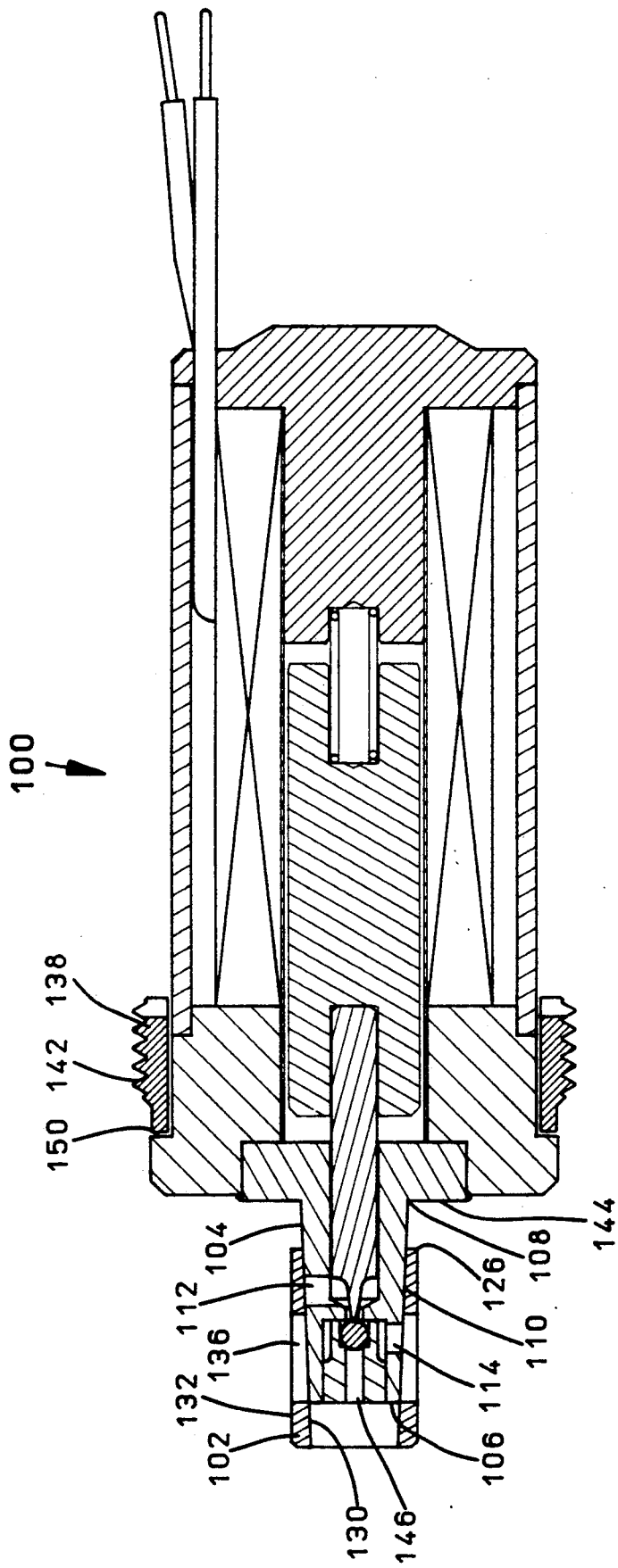
FIG. 6 is an axial sectional view of a second embodiment of an expansion sleeve and inner member in accordance with the present invention shown partially assembled before installation.
Figure 7:
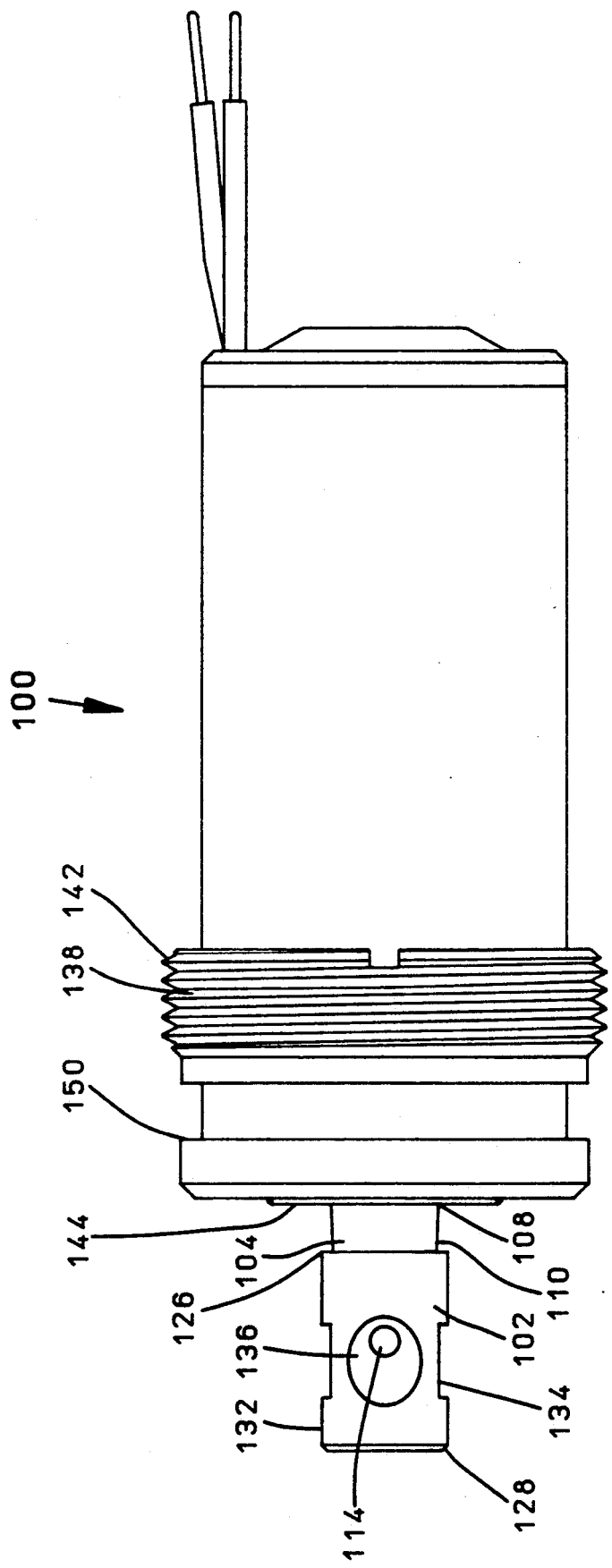
FIG. 7 is a pictorial side view of a second embodiment of an expansion sleeve and inner member in accordance with the present invention shown partially assembled before installation.
Figure 8:
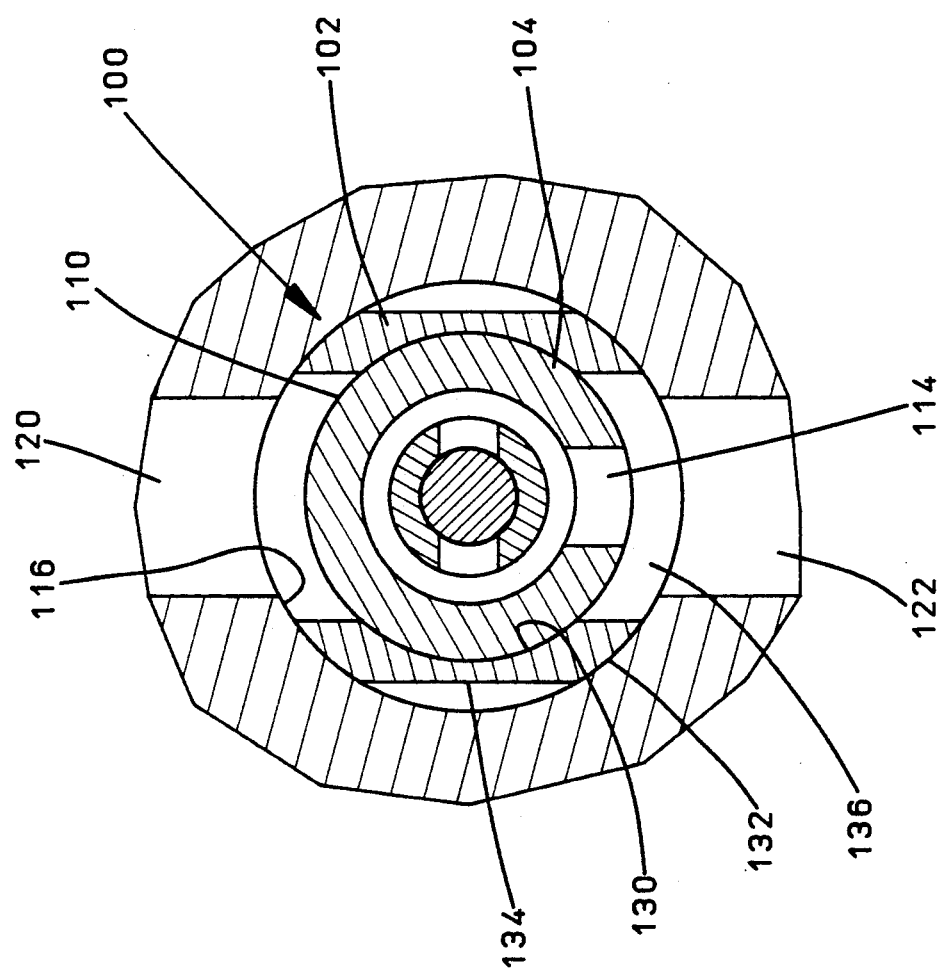
FIG. 8 is a cross sectional view of a second embodiment of an expansion sleeve and inner member in accordance with the present invention taken along the line 8—8 shown in FIG. 5.
Figure 9:
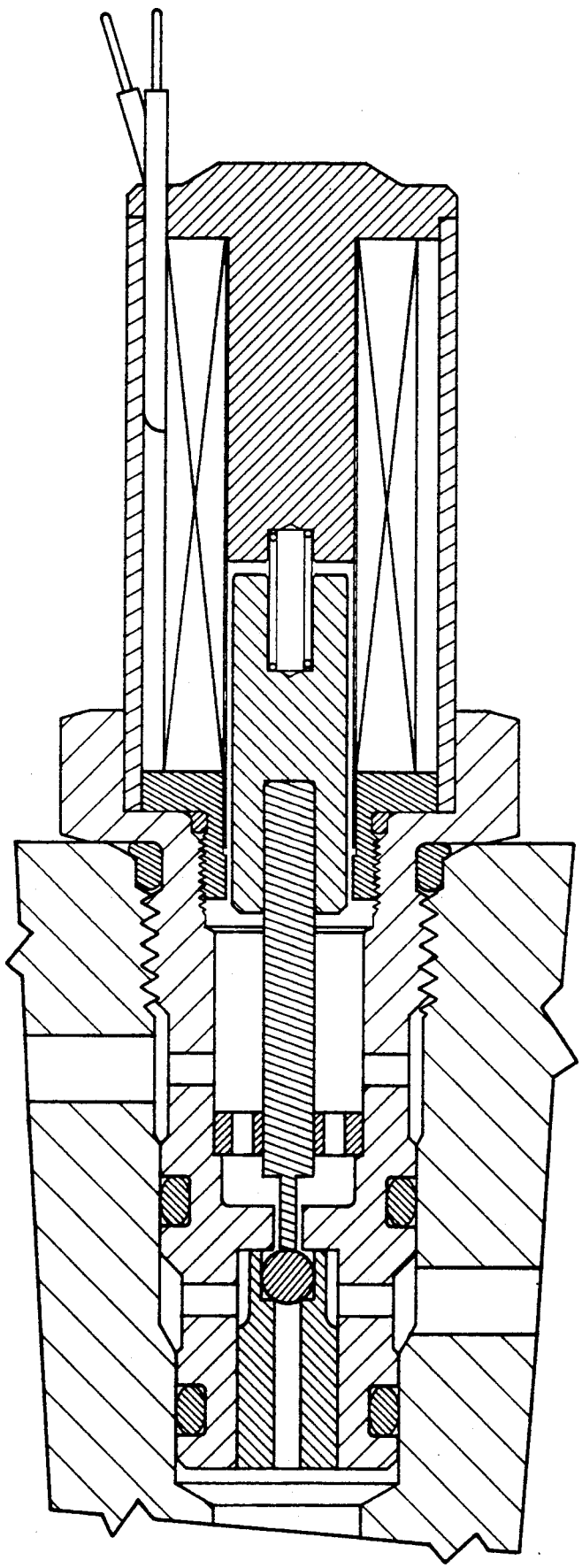
FIG. 9 is an axial sectional view of a typical sealing device shown fully installed in an installation bore.

It will be anticipated that although the drawings illustrate embodiment 100 showing only two radially extending flow passages 120 and 122, the theory and method of the present invention is extendable to configurations adapted for sealing between any number of angularly displaced flow passages that can be reasonably accommodated leaving adequate space for a seal between each flow passage. In the event distortion sensitive parts such as valve seats are present within the inner member 104, as in frequently the case, care must be taken to uniformly and equiangularly distribute the radial stress caused by the interference fit between the sleeve 102 and inner member 104. It has been found that if there are only two stress points, at 180° separation, separated by two relief points, a significant amount of distortion may occur. For this reason, as is seen by FIGS. 6, 7, and 8, the radial stress on the inner member is relieved by a partial flat milling of the sleeve exterior surface 132 at a position that is angularly between openings 136 forming flat milled surfaces 134 that create clearances between the inner member 104 and sleeve 102 thereby relieving radial stress at those points, thus distributing the radial stress over 4 equiangularly displaced stress points. It will be anticipated that in applications involving more than two flow passages, similar steps should be taken to relieve the radial stress. Accordingly any equiangular arrangement of at least three stress points and three relief points are required to prevent distortion, unless any distortion sensitive elements are removed from the area subjected to radial stress.

As with the device 10, it will be anticipated that in some circumstances, such as low pressure applications, or applications without an axial flow passage exposing device 100 to expulsive forces, retaining member 138 could be eliminated if care is taken in selecting the taper angles and materials of sleeve 102 and inner member 104. Elimination of retaining member 138 or 50 means that the rate of taper to sleeve inner surfaces 130 or 40 and inner member outer surfaces 110 or 20 must be such that given the relative coefficients of friction of the materials of sleeves 102 and inner members 104 or 14, the inner members 104 or 14 are adequately self holding within sleeve 102 or 12. In addition, adequate friction between sleeve exterior surface 132 and the installation bore wall 116 is required which would be aided by providing circumferentially extending grooves at the interior and exterior ends of sleeve 102 similar to grooves 44 of device 10. In selecting appropriate materials for either embodiment, it will be appreciated that the sleeve material is generally best selected from materials that are softer and have lower yield strength than either the inner member or the housing. In all applications, it is important to avoid falling on the opposing surfaces of the inner member and sleeve. In most applications, surface galling may be reduced or controlled by smooth preparation of the opposing surfaces and selection of materials for the opposing surfaces that preferably have a difference in Rockwell hardness of at least C-7.

It will further be understood and appreciated that the exterior sleeve surfaces and installation bore wall can be tapered, thereby avoiding the necessity of a stopping shoulder and eliminating the clearance between the sleeve and installation bore wall. In the event such surfaces are tapered and the retaining member is eliminated, the angle of taper of 3.5 degrees to 5.0 degrees is beneficial and selection of materials with appropriate relative coefficients of friction is important.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. An expansion sealing device for installing a fluid system component in a bore to provide fluid communication between the fluid system component and at least one flow passage, comprising a sleeve having an axially extending central bore, and an inner member comprising at least one port communicating with the system component, comprising means for radially expanding the sleeve, and capable of being inserted into the sleeve bore, wherein the sleeve comprises one or more openings therethrough providing fluid communication between the inner member port and the flow passage after insertion of the inner member into the sleeve bore.

2. An expansion sealing device according to claim 1 wherein the inner member has an outside diameter that is greater than the inside diameter of the bore of the sleeve.

3. An expansion sealing device according to claim 2 wherein the outer surface of the sleeve is cylindrical and before insertion of the inner member has an outside diameter that is slightly less than the inside diameter of the installation bore.

4. An expansion sealing device according to claim 3 wherein the inner member and sleeve both have interior ends and exterior ends, and the outer surface of the inner member and the inner surface of the sleeve are axially tapered at approximately the same rate, the interior end having a smaller diameter than the exterior end.

5. An expansion sealing device according to claim 4 further comprising means for retaining the sleeve and inner member within the installation bore.

6. An expansion sealing device according to claim 5 wherein the outside diameter of the sleeve is partially reduced proximate to the sleeve openings to provide fluid communication among sleeve openings and with the flow passage.

7. An expansion sealing device according to claim 6 wherein the retaining means comprises an annular member having an outer surface comprising male screw threads engageable with female screw threads in the installation bore.

8. An expansion sealing device for installing a fluid system component in a bore, providing fluid communication between the fluid system component and a plurality of flow passages that intersect the installation bore at axially spaced positions, comprising a sleeve having an axially extending central bore, and an inner member comprising a plurality of ports communicating with the system component, comprising means for radially expanding the sleeve, and capable of being inserted into the sleeve bore, and the sleeve comprising a plurality of axially spaced openings therethrough providing fluid communication between the inner member ports and the flow passages after insertion of the inner member into the sleeve bore.

9. An expansion sealing device according to claim 8 Wherein the inner member has an outside diameter that is greater than the inside diameter of the bore of the sleeve.

10. An expansion sealing device according to claim 9 wherein the outer surface of the sleeve is cylindrical and before insertion of the inner member has an outside diameter that is slightly less than the inside diameter of the installation bore.

11. An expansion sealing device according to claim 10 wherein the inner member and sleeve both have interior ends and exterior ends, and the outer surface of the inner member and the inner surface of the sleeve are axially tapered at approximately the same rate, the interior end having a smaller diameter than the exterior end.

12. An expansion sealing device according to claim 11 further comprising means for retaining the sleeve and inner member within the installation bore.

13. An expansion sealing device according to claim 12 wherein the outside diameter of the sleeve is partially reduced proximate to the sleeve openings to provide fluid communication among sleeve openings and with the flow passage.

14. An expansion sealing device according to claim 13 wherein the retaining means comprises an annular member having an outer surface comprising male screw threads engageable with female screw threads in the installation bore.

15. An expansion sealing device for installing a fluid system component in a bore within a housing, providing fluid communication between the fluid system component and a plurality of flow passages within the housing that intersect the installation bore at angularly displaced positions, comprising a sleeve having an axially extending central bore, and an inner member comprising means for radially expanding the sleeve, being capable of being inserted into the sleeve bore and comprising a plurality of ports communicating with the system component, and the sleeve comprising a plurality of angularly displaced openings therethrough providing fluid communication between the inner member ports and the flow passages after insertion of the inner member into the sleeve bore.

16. An expansion sealing device according to claim 15 wherein the inner member has an outside diameter that is greater than the inside diameter of the bore of the sleeve.

17. An expansion sealing device according to claim 16 wherein the outer surface of the sleeve is cylindrical and before insertion of the inner member has an outside diameter that is slightly less than the inside diameter of the installation bore.

18. An expansion sealing device according to claim 17 wherein the inner member and sleeve both have interior ends and exterior ends, and the outer surface of the inner member and the inner surface of the sleeve are axially tapered at approximately the same rate, the interior end having a smaller diameter than the exterior end.

19. An expansion sealing device according to claim 18 further comprising means for retaining the sleeve and inner member within the installation bore.

20. An expansion sealing device according to claim 19 wherein the outside diameter of the sleeve is partially reduced proximate to the sleeve openings to provide fluid communication among sleeve openings and with the flow passage.

21. An expansion sealing device according to claim 20 wherein the retaining means comprises an annular member having an outer surface comprising male screw threads engageable with female screw threads in the installation bore.

* * * * *